Figure 1:
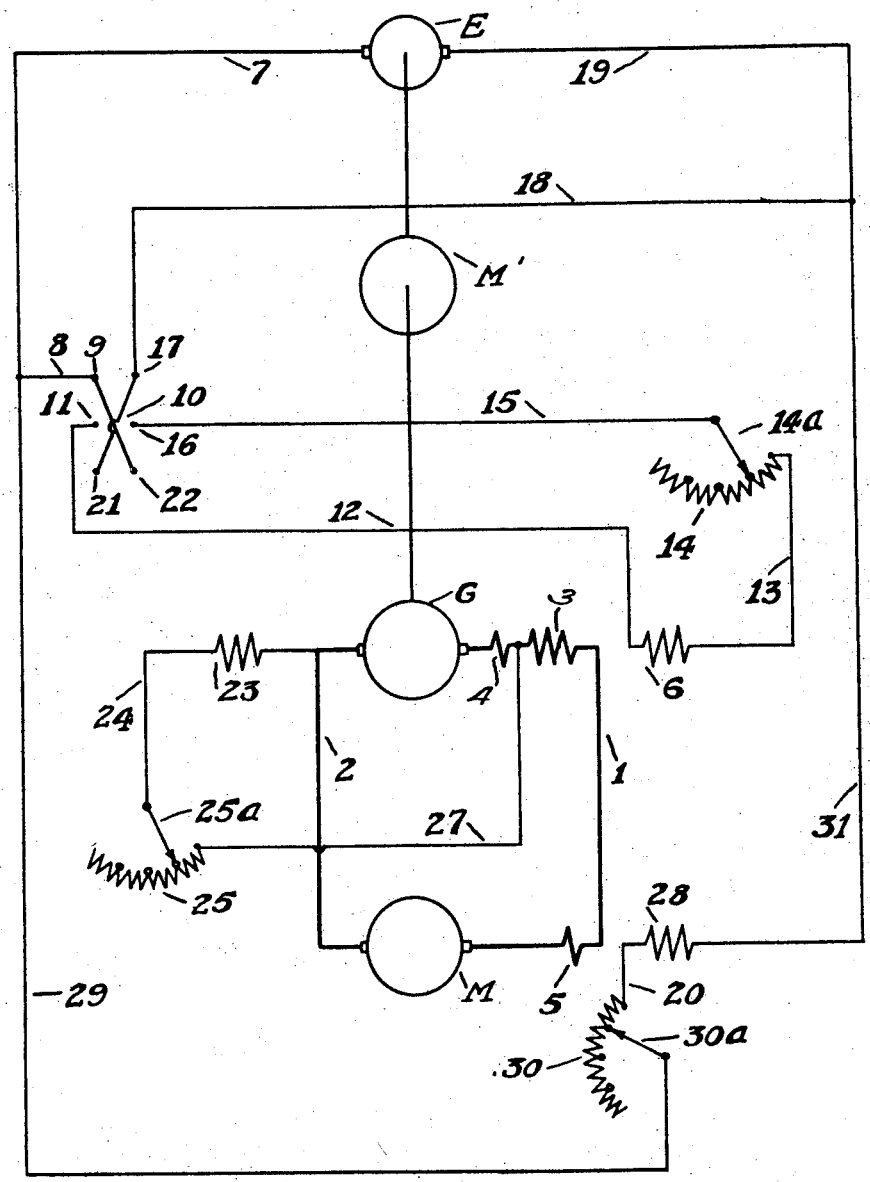

Nov. 14, 1933.    P. S. STEVENS    1,934,745
MEANS FOR CONTROLLING ELECTRIC MOTORS
Filed Aug. 23, 1928    2 Sheets-Sheet 1

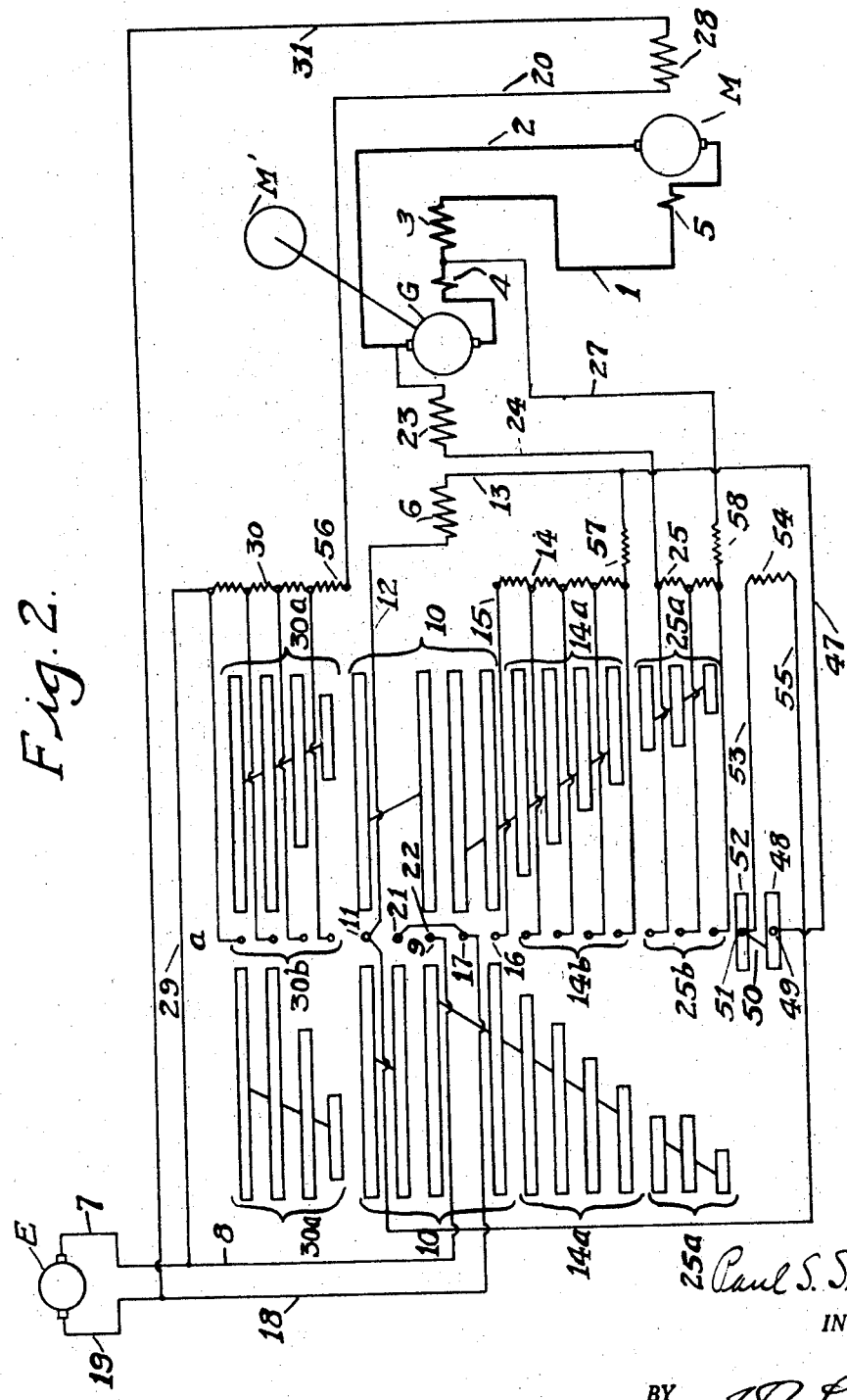

Patented Nov. 14, 1933

1,934,745

UNITED STATES PATENT OFFICE 1,934,745

MEANS FOR CONTROLLING ELECTRIC MOTORS

Paul S. Stevens, South Milwaukee, Wis., assignor to Bucyrus-Erie Company, South Milwaukee, Wis., a corporation of Delaware Application August 23, 1928. Serial No. 301,580

4 Claims. (Cl. 172—239)

Motors have heretofore been controlled by influencing the generator from which the motor receives its current. Such a control is found in what is known as the Ward-Leonard apparatus. In handling some sorts of machines, such for instance as power excavators, peculiar conditions are encountered which require a variation from the controls heretofore used.

One of the difficulties, or problems encountered in such apparatus is the danger of delivering to the implement a greater power than the implement is designed to sustain. This is particularly of importance with relation to power shovels in that with an excessive power the shovel may be over-turned, or mechanical parts may be broken.

In an effort to correct this difficulty, heretofore apparatus of this type has been hooked up with a separately excited main field and a differential series field for the generator, the generator being controlled by varying the resistance in the separately excited field circuit. With such a structure, as the motor draws heavier current, the generator series field is increased and overpowers the separately-excited field and in consequence the net field strength is reduced so that at some definite pre-determined point the generator voltage dies, thus making a point of safety in the operation of the device. A serious defect, however, developed in this structure, in that this tapering off was too gradual, so that in the higher working ranges the speed of the controlled motor was seriously affected. To correct this difficulty, the separately excited field was supplemented by a self-excited shunt field, the effect of which was to boost the voltage of the generator and consequently the speed of the motor at a working range closer to this diminishing point of safety. This self-excited field, being directly excited by the generator fades out at the safety point, when the series field neutralizes the two shunt fields, so that as a matter of safety the arrangement is just as effective as where the self-excited shunt field is omitted, but in the working range the field strength of the self-excited shunt field is added to that of the separately-excited field as opposed to the series field, and consequently a better working condition is produced.

Difficulty arose in the operation of this last-mentioned apparatus, however, in that with such machines as power shovels very frequent and rapid stoppages and reversals are necessary and when, in the effort to stop the motor, the separately excited field was diminished through the variable resistance of the control, the field strength of the self-excited field continued practically undiminished and would dominate in the last analysis the series field at light loads, and in consequence the motor could not be stopped, or at least not with rapidity, except by reversing the separately-excited field so as to buck down the greater strength of the self-excited field.

I have found that this difficulty may be considerably obviated by interposing, in the self-excited field circuit, a variable resistance which will be increased as the field strength of the separately excited field is reduced. In this way the tendency of the self-excited field to remain built up, in spite of the reduction of the separately-excited field, is considerably obviated.

I prefer to provide completely separate circuits for the separately-excited field and the self-excited field and to provide a variable resistance in each of these circuits, these resistances being controlled in practice by a common controller, varying the circuits in the same sense.

Features and details of my invention will appear more fully from the specification and claims.

A preferred embodiment of the invention is illustrated in the accompanying drawings as follows:—

Fig. 1 shows the system, or apparatus, diagrammatically.

Fig. 2 a view in which the system is illustrated in connection with a development of an ordinary controller.

M' marks a prime mover. As shown, this is indicated as an electric motor but may be of any form of prime mover. A generator G is mechanically connected with this prime mover and an exciter E may also be directly connected with such prime mover. The controlled motor M, such for instance as the hoisting, swinging, or crowding motor of a power shovel, is electrically connected and driven from the generator being directly connected thereto by wires 1 and 2. A generator field 3 is arranged in series in the wire 1, and a commutating field 4 may also be in series in the usual manner. A commutating field 5 may also be in series in the line 1 for the motor M.

A separately-excited field 6 is the main operative field of the generator. It is opposed and at higher voltages neutralized by the differential series field 3 of the generator. This field 6 is connected with the exciter E through the following circuit: A wire 7 leads from the exciter. It is connected by a wire 8 to the post 9 of a reversing switch 10. In a forward direction, current is carried by the switch to a post 11, passes by a wire 12 from the post 11 to the field 6, and from the field by a wire 13 to the variable resistance 14 controlled by the movable arm 14a, and from this movable arm by a wire 15 to a post 16, from the post 16 by the reversing switch 10 to a post 17 and thence by wires 18 and 19 to the exciter. By varying the resistance 14 the strength of the field 6 may be varied to vary the effective field of the generator, thus varying its voltage and in consequence the power of the motor.

The reversing circuit is indicated as follows: When the reversing switch is thrown, a post 21 is connected with the post 11, and a post 22 is connected with the post 16, thus reversing the current through the circuit passing through the field 6.

A self-excited shunt field 23 is provided for the generator G. This field supplements the separately-excited field 6, and is likewise opposed by the series field 3. The circuit for this field is as follows:—A wire 24 extends from the field 23, to a movable arm 25a operating on a resistance 25, and from the resistance 25 by wire 27 to wire 1. By varying the resistance 25, the resistance through the field 23 may be varied, thus cutting in this resistance and obviating the tendency of the generator to over-run by reason of a continued field strength in the self-excited field 23 as above suggested. A common controller operates the arms 14a and 25a and these may be arranged so as to handle the resistances 14 and 25 in proper relation. Generally it is desirable to first cut out the resistance in the separately-excited field, following this by a similar operation in the self-excited shunt field, but this relation may be varied to suit the conditions.

In this way it is possible to get the full voltage strength of the generator in the working range of the motor, have a complete control of the motor through that range including reductions of speed and reversal, and still maintain the safety limit at which the generator voltage is insufficient to drive the motor.

A field 28 for the motor may be arranged in the exciter circuit, this circuit being traced through the wire 29 from the wire 7, movable arm 30a and variable resistance 30 by wire 20 through the field 28 and wire 31 to the wire 19 leading to the exciter. This operates in the well-known manner.

In Fig. 2 I have indicated a practical installation carrying out the scheme as illustrated diagrammatically in Fig. 1. In this figure I have indicated a controller as developed, and the same parts as appear in Fig. 1 are identified with the same reference numerals. The several contact fingers are indicated in a line a and the wires having the circuits, as indicated in the diagram, lead to these several contacts. The movable arm 30a of the diagram, Fig. 1, corresponds to the group of segments 30a, electrically connected together and operating in connection with contacts 30b in the ordinary controller manner, the contacts being connected with the resistance sections 30 and being cut out successively in the ordinary manner of a controller, and thus controlling the resistance to the field of the motor as in common practice. These segments are arranged at opposite sides of the line a and operate in exactly the same manner, one set of segments for the forward motion and the other for the reverse. These may be varied, if desired, to vary conditions, as for instance when there is a marked difference of power requirements in one direction than in the other, as in a hoisting engine on a power shovel, these segments may be varied to take care of the conditions.

The contacts of the reversing switch are indicated in the line a, and operate in relation to a series of segments, the group of which are indicated at 10 corresponding to the reversing switch in Fig. 1. These operate in the ordinary manner of controller reversing switches.

In like manner the movable arm 14a, as indicated in the diagram, Fig. 1, corresponds to the series of segments 14a on the controller drum operating in connection with contacts 14b, successively cutting out sections of the resistance 14 in the usual manner. The movable arm 25a as indicated in the diagram, Fig. 1, corresponds to a series of segments 25a on the controller drum operating in connection with the contacts 25b and these cut out successive sections of the resistance 25 varying the field strength of the self-excited field 23.

In addition I have shown in Fig. 2 the discharge resistor, which as shown interposes a discharge resistance against the generator separately-excited field when the controller is in the off-position and the field is thus disconnected from the exciter. This may be readily followed in the drawings, starting with the field 6. The connection runs, by wire 13 and wire 47, to a contact 49 (this contact, when the controller is in neutral position, being operated on by the segment 48, connected by wire 50 with segment 52), and thence, by contact 51 and wire 53, through discharge resistance 54, wire 55, contact 11, and wire 12, to the other side of the field. The purpose of this is well-understood.

It will be noted that I have interposed, in the practical embodiment, the permanent resistances 56, 57 and 58 in the several field circuits, for the purpose of permanent adjustment.

By completely disconnecting the separately-excited and self-excited field circuits any disturbing tendency of current transfers from one circuit to the other is obviated.

While I have shown in these figures a direct connection between the controller and the various fields controlled thereby, it will, of course, be understood that the controller may act merely as a pilot operating separately interposed magnetic contacters, where the current or voltage requirements are too great to be handled directly by the controller. To the same end, the controls herein described may operate on a pilot generator, the pilot generator controlling an interposed generator furnishing the current direct to the motor. In such case the pilot generator has the separately-excited shunt, self-excited and series fields herein described, and the interposed generator has a field excited from the armature of the pilot generator; but in each case the motor is connected and directly responsive to generator current, in that the motor control is accomplished through the generator control. I do not wish to be limited, therefore, to a control which operates directly upon the wires of the generator furnishing the main current to the motor, as such pilot arrangements may be used where such current is sufficiently great to make the use of a small controller impractical.

What I claim as new is:—

1. In an electric control system, the combination of: a generator, having a self-excited shunt field, a separately-excited field, and a series field, the series field being opposed to the self-excited shunt field and the separately-excited field; disconnected electric circuits for the shunt field and the separately excited field; a controller for interposing variable resistance to each of the shunt field and the separately excited field, said controller inserting the maximum resistance to each of such fields when said controller is set near neutral, and cutting out the resistance in the separately-excited field circuit in advance of cutting out the resistance in the self-excited shunt field circuit as said controller is moved away from neutral; and a motor directly responsive to generator voltage.

2. In an electric control system, the combination of: a generator, having a self-excited shunt field, a separately-excited field, and a series field, the series field being opposed to the self-excited shunt field and the separately-excited field; disconnected electric circuits for the shunt field and the separately excited field; a controller for interposing variable resistance to each of the shunt field and the separately excited field, said controller inserting the maximum resistance to each of such fields when said controller is set near neutral, and cutting out the major part of the resistance in the separately-excited field circuit in advance of cutting out the major part of the resistance in the self-excited shunt field circuit as said controller is moved away from neutral; and a motor directly responsive to generator voltage.

3. In an electric control system, the combination of: a generator, having a self-excited shunt field, a separately-excited field, and a series field, the series field being opposed to the self-excited shunt field and the separately-excited field; disconnected electric circuits for the shunt field and the separately excited field; a controller for interposing variable resistance to each of the shunt field and the separately excited field, said controller inserting the maximum resistance to each of such fields near neutral, and cutting out the major part of the resistance in the separately-excited field circuit in advance of cutting out the major part of the resistance in the self-excited shunt field circuit as said controller is moved away from neutral; a motor directly responsive to generator voltage; and a separately-excited field for the motor, the variation of the separately-excited generator field being independent of any variation of the separately-excited motor field.

4. In an electric control system, the combination of: a generator, having a self-excited shunt field, a separately-excited field, and a series field, the series field being opposed to the self-excited shunt field and the separately-excited field; disconnected electric circuits for the shunt field and the separately excited field; a controller for interposing variable resistance to each of the shunt field and the separately excited field, said controller inserting the maximum resistance to each of such fields when said controller is set near neutral, and cutting out at least some of the resistance in the separately-excited field circuit in advance of cutting out the major part of the resistance in the self-excited shunt field circuit as said controller is moved away from neutral; and a motor directly responsive to generator voltage.

PAUL S. STEVENS.